United States Patent [19] … [11] Patent Number: 4,905,402
Clark … [45] Date of Patent: Mar. 6, 1990

[54] FISH HOOK WITH LURE ATTACHING DEVICE

[76] Inventor: Thomas C. Clark, Rte. 1, Box 137, Hampton, Fla. 32044

[21] Appl. No.: 324,099
[22] Filed: Mar. 16, 1989
[51] Int. Cl.⁴ .............................................. A01K 83/00
[52] U.S. Cl. .................................................. 43/43.16
[58] Field of Search .................... 43/43.16, 44.2, 44.6, 43/44.8

[56] References Cited

U.S. PATENT DOCUMENTS

| | | | |
|---|---|---|---|
| 842,594 | 1/1907 | Van Vleck | 43/43.16 |
| 877,793 | 1/1908 | Murphy | 43/44.2 |
| 991,745 | 5/1911 | Randal | 43/44.6 |
| 2,538,052 | 1/1951 | Schwarzer | 43/44.8 |
| 2,592,727 | 4/1952 | Pamer | 43/43.16 |
| 4,570,373 | 2/1986 | Brief | 43/43.16 |

FOREIGN PATENT DOCUMENTS 2158683 11/1985 United Kingdom ............... 43/43.16

Primary Examiner—M. Jordan
Attorney, Agent, or Firm—Arthur G. Yeager

[57] ABSTRACT

A fish hook having the general shape of the letter "C" with an eye at one end and a barbed point at the other end, and spring biased fastening device of fine wire rigidly attached to the eye of the fish hook and having a hook member which engages the shank of the fish hook near the eye to clamp a plastic worm to the fish hook.

20 Claims, 2 Drawing Sheets

FISH HOOK WITH LURE ATTACHING DEVICE

RELATED DOCUMENT

This invention is described in Disclosure Document No. 199238 dated Aug. 15, 1988.

BACKGROUND OF THE INVENTION

This invention relates to a weedless fishing lure comprising a hook, a plastic worm lure, and a clamping device to attach the lure to the hook.

Fish hooks with a plastic worm lure attached are well known. In order for these combinations to be weedless, i.e., not to have a pointed end exposed to be able to catch on weeds as the lure is pulled through a weed bed, a wire loop is pivoted at the eye of the hook with the loop extending to the barbed point and latches in place at the barb. When the fish bites it causes the loop to unfasten and pivot away from the barb allowing the fish to be caught by the barbed point. It is very difficult to make a loop which will not open when pressed against a weed but will open when a fish bites, and therefore, this type of prior art device is not entirely satisfactory. Continued use of such a device eventually makes it inoperable because the loop will not close to make the hook weedless. Still another problem of the prior art devices is that the plastic lure, which is threaded on the hook by piercing the lure with the barbed point and running it down the centerline of the lure, slides up and down on the steel hook shank, exposing the shank and eye of the hook, which makes the lure less effective because it does not look like a live worm when any portion of the shank and eye is exposed. The present invention eliminates both of these prior art defects.

It is an object of this invention to provide a novel fish hook having a lure attaching device on the hook. It is another object of this invention to provide a novel fish hook having a lure attaching device affixed to the eye of the hook and adapted to clamp the head of a plastic worm so it will not slide away from the eye. Still other objects will become apparent from the more detailed description which follows.

BRIEF SUMMARY OF THE INVENTION

This invention relates to a solid metal fish hook having a lure attaching device attached thereto, comprising a fish hook with an eye at one end and a sharp point at the other end pointing generally toward said eye and an arcuate shaft joining the two ends, the shaft adjacent said other end having a generally triangular cross section with the apex of the triangle facing away from said pointed end, a substantial length of said shaft generally medial of said two ends having a flattened surface facing away from said two ends; and a lure attaching device rigidly fastened to said one end and including a spring biased hook removably attachable to said shank adjacent said eye.

In specific and preferred embodiments of this invention the lure attaching device is a length of fine wire bent to include a helical spring portion intermediate the ends, one of which being rigidly affixed to the eye of the fish hook and the other of which being fashioned into a hook capable of catching the shank of the hook near the eye and being spring biased by the helical spring portion to be clamped to the shank.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
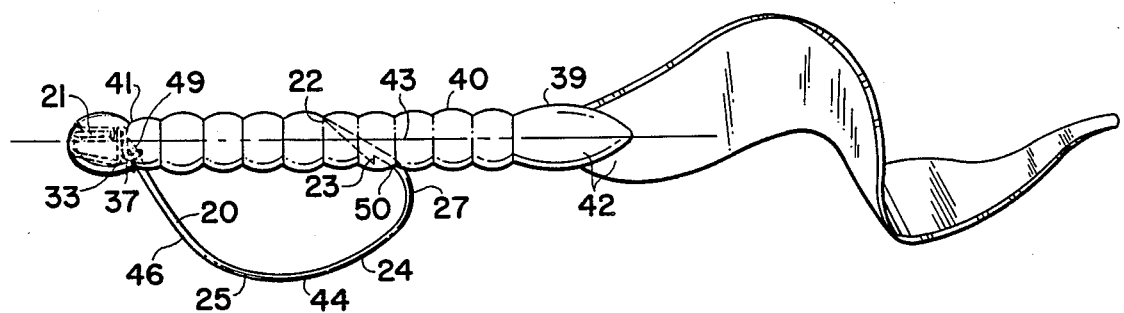
FIG. 1 is a side elevational view of the fish hook of this invention with a plastic worm lure attached thereto and clamped in place by the lure attaching device.

The features of this invention are best understood by reference to the attached drawings where the same reference number is used in all drawings for the same feature.

The invention relates specifically to a fish hook 46; having a shank 20, an eye 21 at one end of the shank 20, and a sharp point 22 at the other end; a plastic worm lure 39; and a lure attaching device 33 affixed to the eye 21 or adjacent the eye 21 of fish hook 46. The lure 39 is not an inventive feature, since any commercially available plastic lure, whether representing a worm or a fish, or other natural aquatic bait animal, may be employed with the combination of hook 46 lure attaching device 33.

Figure 2:
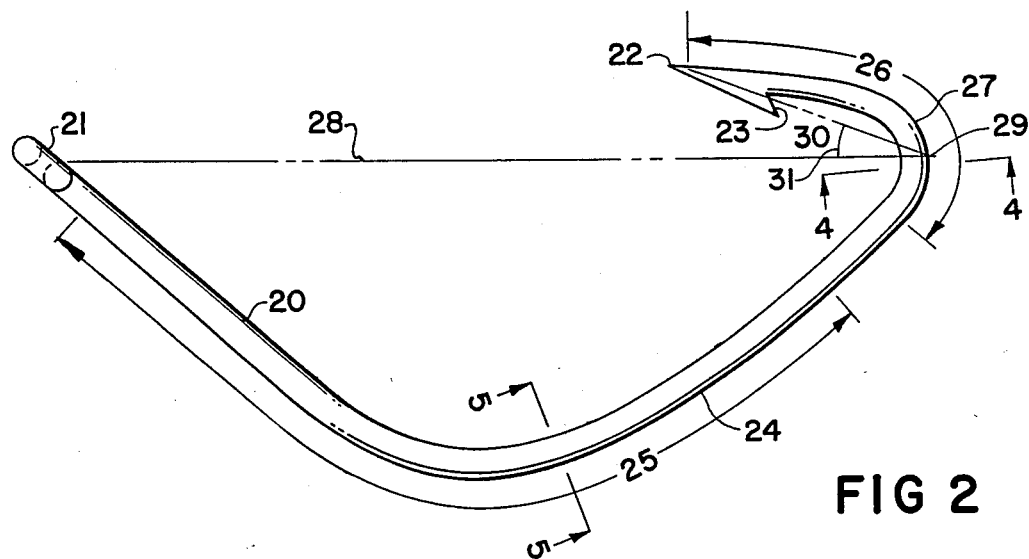
FIG. 2 is a side elevational view of the fish hook element of this invention.
Figure 3:
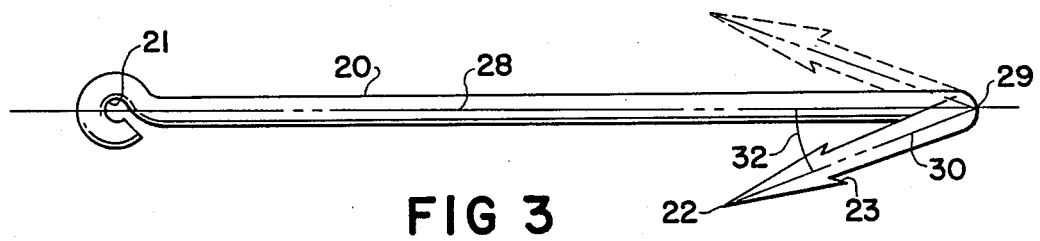
FIG. 3 is a top plan view of the fish hook member of FIG. 2.

The features of fish hook 46 are shown in FIGS. 2 and 3. Hook 46 is a length of solid metal wire or rod, preferably steel, comprising a shank portion 20, an eye portion 21, and a point portion 22, all of which are parts of a single length of wire or rod. Shank portion 20 is bent generally into the shape of the letter "C". The eye portion 21 at one end of shank portion 20 is merely a toroidal loop which is substantially closed by bending to leave a hole 47 in the middle for attaching a fishing line or leader. The other end of shank portion 20 is sharpened into a point, preferably but not necessarily with a barb 23 a short distance from the point 22, e.g., 5–10 diameters of shank 20. In order to provide the most efficient hook for catching a fish it has been found that pointed end 22 should not be directed toward eye 21 but should be angled away from eye 21. These features are shown in FIGS. 2 and 3. A first straight line 28 is drawn from eye 21 to the most distant point 29 on the outside surface 24 of shank portion 20. A second straight line 30 is drawn from point 29 to point 22 at the end of shank 20. These two lines 28 and 30 intersect at an angle 31 as seen in FIG. 2 which is a side elevational view of hook 46. The same two lines 28 and 30 intersect at an angle 32 in FIG. 3 which is a top plan view of hook 46. FIG. 3 shows two alternative embodiments of hook 46 depending upon the direction of line 30. As shown in solid lines point 22 is directed below (as seen in FIG. 3) line 28 or below eye 21. As shown in dotted lines point 22 is directed above (as seen in FIG. 3) line 28 or above eye 21. There is only one alignment possible for point 22 in the view seen in FIG. 2 and that is above line 28 or above eye 21. To have point 22 be directed below line 28 or below eye 21 in FIG. 2 would result in a completely inoperative fish hook, and so such an embodiment is not considered to be a part of this invention. The direction of point 22 in FIG. 2 is shown by angle 31, which should be 5°-15°, preferably about 10°. The direction of point 22 in FIG. 3 is shown by angle 32 which should likewise be 5°-15°, preferably about 10°. These features of the alignment of point 22 are important in providing a highly efficient fish hook which will tend to hook the fish in the top and sides of the mouth, rather than have a good possibility of being spit out by the fish without being hooked (as in the case when angles 31 and 32 approach 0°. If these angles are too large the lure with the hook embedded therein does not look like a natural bait and may therefore be spurned by the fish.

Figure 9:
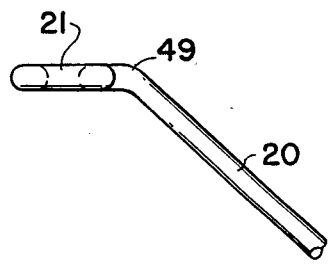
FIG. 9 is a partial side elevational view of a second embodiment of the hook of FIGS. 2 and 3.

The other important features of the fish hook 46 are the shapes of the cross sections of shank portion 20, the configuration of the outside surface 24, and the general overall shape, as seen in the elevational view of FIG. 2, of shank portion 20. Many earlier prior art fish hooks had a substantial length of shank portion 20 in a straight line from eye 21 toward pointed end 22, with only a small part of the length being devoted to forming the return bend so that pointed end 22 generally would be directed toward eye portion 21. Such a hook was thought to be easy for the fish to swallow. The hook of this invention does not follow that pattern. To the contrary, the present invention provides a hook which has the shape of the letter "C", and there is no straight portion from eye 21 toward point 22. With the exception of the portion of shank 20 near eye 21, the entire shank portion 20 is arcuate departing greatly from line 28, somewhat like a semicircle departs from the diameter joining the ends of the semicircle. In FIG. 9 there is a nonpreferred embodiment wherein the entire shank portion from eye 21 to point 22 is arcuate. This shape helps to force point 22 into the fish's mouth when the mouth closes over the lure and thus is better assurance for catching the fish, and the outside surface 24 over the length 25 provides a runner for dragging the fish lure along the bottom or over weeds in the underwater area being fished.

Figure 5:
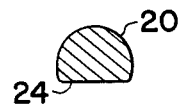
FIG. 5 is a cross sectional view taken at 5—5 of FIG. 2.

Two sections of shank portion 20 are especially shaped for this invention. Outside surface 24 over the length 25 is flattened, and preferably roughened. If the original cross section of shank 20 is round as is the case in most fish hooks, the length 25 is hammered, filed, or otherwise flattened, and preferably roughened, e.g., by filing, grinding, or painting with a grit containing paint. The length of section 25 and its exact location is very critical, because the flat portion just below the hook eye 21 is usually the first part of the hook contacted by the mouth of the fish and the flattened outside assures that the hook point will be set securely as the mouth of the fish closes on the hook. This feature is believed to be an important factor in keeping the fish on the hook until retrieved. Flattened section 25 is about three quarters of the total length of shank 20. The portion farthest away from point 22 is the part most important to flatten and to roughen. A typical cross section of this part of shank portion 20 is shown in FIG. 5 with flattened and roughened surface being the outside surface 24 of shank 20. If the original shape of shank portion is rectangular or triangular there will probably be no need to further flatten outside surface 24, but it may have to be roughened to provide the best mode of embodiment.

Figure 4:
FIG. 4 is a cross sectional view taken at 4—4 of FIG. 2.

Another section of shank portion 20 which preferably is given a special shape is that represented by length 26, extending from point 22 around and beyond most distant point 29 for some short distance. In this section outside surface 24 is a sharp edge which may vary from a more or less slender knife edge to the edge where two surfaces, preferably planar, intersect at an inclined angle of not more than about 60°. A preferred cross sectional shape of shank portion 20 in this length 26 is triangular (see FIG. 4) with the apex 27 of the triangle being a part of outside surface 24. This sharp edge is obviously needed at and near point 22 to be able to pierce the fish easily. It is also important that this sharp edge continue around and beyond point 29 to facilitate the threading of a plastic lure 39 (see FIG. 1) onto hook 46 without undue tearing of the lure head 41 and body 40. The length of section 26 is generally less than about one quarter of the total length of shank 20.

Figure 6:
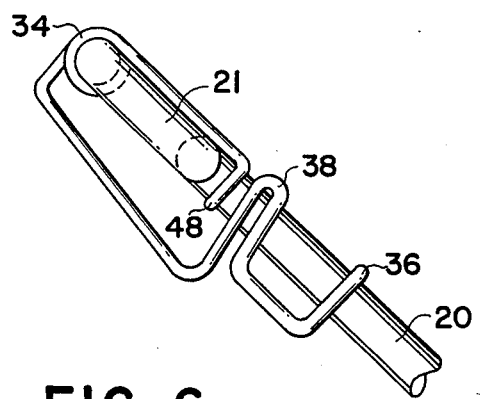
FIG. 6 is an enlarged side elevational view of the eye portion of the fish hook element with the lure attaching device affixed thereto and with the hook clamping member attached to the shank of the fish hook.
Figure 7:
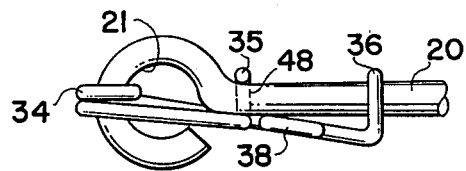
FIG. 7 is a top plan view of the enlarged view of FIG. 6.
Figure 8:
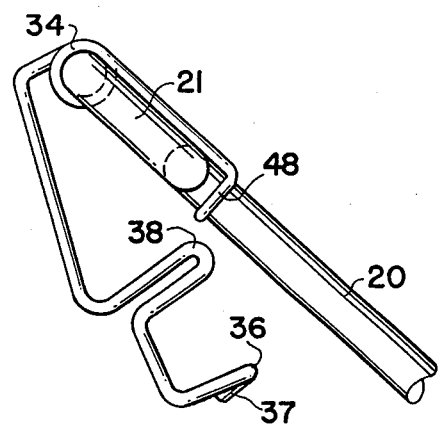
FIG. 8 is an enlarged side elevational view similar to that of FIG. 6 except that the hook clamping member is not attached to the shank of the fish hook.

The lure attaching device 33 is an important feature of this invention. This device, in general, is a spring biased hook which is adapted to releaseably clamp lure 39 to fish hook 46 to prevent the lure 39 from sliding along shank 20 when in use fishing. The embodiment shown here for attaching device 33 is a length of fine (small diameter) wire which is bent to form a helical spring means 34 intermediate the two ends of the wire. One end is rigidly affixed to the hook 46 adjacent eye 21. The rigid affixing may be accomplished by bending and twisting the wire around eye 21 and the adjacent portion of shank 20 so as to fasten the wire tightly to eye 21. A preferred embodiment is shown wherein the wire from helical spring means 34 is passed across hole 47 in eye 21, and then wrapped around shank 20 adjacent eye 21 at 48. The helical spring portion may be wrapped around a portion of eye 21 as seen in FIGS. 6–8, or it may be outside eye 21 so long as the end of the wire is affixed to hook 46 adjacent eye 21. If the helical spring portion 34 is wrapped around a portion of the eye 21 as shown in FIGS. 6–8 it may be formed away from eye 21 and then slid onto eye 21 by temporarily opening eye 21 by using pliers, and after sliding spring portion 34 onto eye portion 21, the opening can be closed with pliers. With most malleable wire such a configuration will hold the clamping device 33 tightly to eye 21, but it may be made even more secure by soldering or welding the wire in place around eye 21. The other end 36 of the wire from helical spring means 34 is bent to form a hook 37 that will fit over and around shank 20. A finger lever bend 38 is preferably formed near hook 37 to facilitate manipulation of hook 37 to fasten it to shank 20 and to release it from shank 20. FIGS. 6 and 7 show a preferred embodiment of a wire clamping means with hook 37 fastened to shank 20, while FIG. 8 shows hook 37 not fastened to shank 20. Other similar structures can be employed as clamping means 33; it being only necessary that it be capable of clamping a plastic lure around shank 20 and against eye 21 so as to prevent it from sliding along shank 21 when clamped.

In order to properly employ the hook and clamping means of this invention with a plastic lure, point 22 of hook 46 is inserted into head 41 of lure 39 and directing it down the central lengthwise axis 43 of lure 39. Point 22 is directed outwardly so as to exit from head 41 just beyond the location of hook 37 of the lure fastening device 33 at 49. The distance of exit 49 from the place of entrance of point 22 into head 41 is only about one-quarter inch. Point 22 is then pushed into body 40 of lure 39 at 50 so that head 41 and body 40 of lure 39 are in substantially a straight line to best represent a natural bait. Tail portions 42 will be free to trail along behind hook 46 to bend and twist in the water currents in a natural fashion. Clamping device 33 is then closed so that hook 37 fastens over shank 20 inside of head 41. This means that hook 37 will pierce lure 39 at head 41 and be fastened around shank 20 to effectively prevent lure 39 from sliding along shank 20 until head 41 becomes torn. Generally, this type of hook and clamping means provides the fisherman with the opportunity to reuse the lure many times after catching a fish with it.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to be secured by Letters Patent of the U.S. is:

1. A solid metal fish hook having a lure attaching device attached thereto, comprising a fish hook with an eye at one end and a sharp point at the other end pointing at a small angle away from said eye and an arcuate shaft joining the two ends, a short length of the shaft at said other end adjoining said point having a generally triangular cross section with the apex of the triangle facing away from said pointed end, a substantial length of said shaft generally medial of said two ends, having a flattened surface facing away from said two ends; and a lure attaching device rigidly fastened to said one end and including a spring biased hook removably attachable to said shank adjacent said eye.

2. The hook of claim 1 wherein said sharp point is a barbed point.

3. The hook of claim 1 wherein a first straight line from said eye to said shank at its most distant point from said eye and a second straight line from said distant point to said sharp point intersect at an angle of about 5°–15°.

4. The hook of claim 3 wherein said angle is about 10°.

5. The hook of claim 1 wherein said lure attaching device is a length of wire having a helical spring intermediate two ends of said length, one of said ends being twisted around said eye and rigidly affixed thereto and the other end formed into a hook for releaseable attachment to said shaft adjacent said eye.

6. The combination of the fish hook of claim 1 and a plastic worm fishing lure threaded thereonto, the lure having a head, a tail, and a lengthwise central axis, said head contiguous to said eye, and shaft from adjacent said eye to adjacent said sharp point being outside said lure, and said sharp point being embedded in said lure which is positioned generally linearly from said head to said tail, said head being clamped to said shaft adjacent said eye by said spring biased hook of said lure attaching device to prevent longitudinal sliding of said head over said shaft.

7. A fishing hook comprising a steel shaft bent into a general C-shape with an eye at one end of said shaft and a barbed sharp point at the other end of said shaft; said shaft having an outside surface on the convex side of said C, said outside surface being flattened for at least one half of the length of said shaft generally medially of said eye and said point, said outside surface being a sharp edge from said point to a juncture with said flattened portion, a straight line from said eye to the most distant point on said outside surface and a straight line from said most distant point to said sharp point intersecting at an angle of about 5°–15° and extending above said eye when viewed in a side elevation and intersecting at an angle of about 5°–10° and extending to one side or the other of said eye when viewed in a top plan view, and having a wire structure rigidly attached to said hook adjacent said eye, said structure including a spring biased clamping hook which is releaseably attachable to said shank adjacent said eye.

8. The hook of claim 7 wherein said angle when viewed in side elevation is about 10°.

9. The hook of claim 9 wherein said wire structure comprises a length of fine wire bent to form a helical spring portion intermediate two ends of said wire, one of said ends being rigidly attached to said eye, and the other end bent to form a hook which is adapted to releaseably fit around said shank adjacent said eye.

10. The hook of claim 7 in combination with a plastic fish lure worm having a head portion and a body portion, said worm being skewered on the shank of said fish hook and pressed against said eye and clamped so as not to slide lengthwise on said shank by said clamping hook attached to said shank while piercing through said head, and said barbed sharp point is embedded in said body, and the shank portion between said eye and said barbed point being outside said plastic fish lure worm.

11. A fishing hook comprising a steel shaft bent into a general C-shape with an eye at one end of said shaft and a barbed sharp point at the other end of said shaft; said shaft having an outside surface on the convex side of said C, said outside surface being flattened for at least one half of the length of said shaft generally medially of said eye and said point, said outside surface being a sharp edge from said point to a juncture with said flattened portion, a straight line from said eye to the most distant point on said outside surface and a straight line from said most distant point to said sharp point intersecting at an angle of about 5°–15° and extending above said eye when viewed in a side elevation and intersecting at an angle of about 5°–10° and extending to one side or the other of said eye when viewed in a top plan view.

12. The hook of claim 11 wherein said angle when viewed in side elevation is about 10°.

13. The hook of claim 11 further comprising a wire structure rigidly attached to said hook adjacent said eye, said wire structure including a spring biased clamping hook which selectively is releaseably attachable to said shank adjacent said eye.

14. The hook of claim 13 wherein said wire structure further comprises a length of fine wire bent to form a helical spring portion intermediate two ends of said wire, one of said ends being rigidly attached to said eye, and the other end bent to form a hook which is adapted to releaseably fit around said shank adjacent said eye.

15. The hook of claim 13 further comprising a plastic fish lure worm having a head portion and a body portion, said worm being skewered on the shank of said fish hook and pressed against said eye and clamped so as not to slide lengthwise on said shank by said clamping hook attached to said shank while piercing through said head, and said barbed sharp point is embedded in said body, and the shank portion between said eye and said barbed point being outside said plastic fish lure worm.

16. A lure attaching device for a fish hook having an eye, a shank, and a point comprising an elongated member having opposite end portions, one of said end portions being rigidly attachable to a fish hook in its eye and adjacent thereto, the other of said end portion being formed into a hook removably attachable to said shank adjacent said eye, said member adjacent said eye including an engaging portion engageable with a plastic worm's head portion after being threaded onto a hook and disposed adjacent said eye frictionally sandwiched between said engaging portion and said shank adjacent adjacent said eye.

17. The device of claim 16 wherein said hook is spring biased onto a fish hook and said one end portion is affixed to a fish hook.

18. The device of claim 16 wherein said member is a length of wire having a helical spring intermediate said end portions, said one end portion being twisted around an eye of a fish hook and rigidly affixed thereto and said other end portion being formed into said hook for releaseable attachment to a fish hook adjacent its eye.

19. The device of claim 16 further comprising an elongated fish hook having an eye at one end thereof and a point at the other end thereof extending generally toward said eye, said one end portion being threaded through said eye, spirally wrapped around said shank adjacent said eye and threaded back through said eye and having a free end hooked over said shank.

20. The device of claim 19 further comprising spring means between said end portions for biasing said other end portion into locking engagement of said hook of said member with said shank of said fish hook, said engaging portion being elongated and in the form of a V which extends generally laterally across said shank to firmly engage a head of a plastic worm threaded onto said fish hook with such head being adjacent said eye.

* * * * *